United States Patent
Ogasawara

(10) Patent No.: US 10,376,778 B2
(45) Date of Patent: Aug. 13, 2019

(54) INFORMATION PROCESSING SYSTEM, INFORMATION PROCESSING APPARATUS, AND COMPUTER-READABLE NON-TRANSITORY STORAGE MEDIUM HAVING STORED THEREIN INFORMATION PROCESSING PROGRAM

(71) Applicant: NINTENDO CO., LTD., Kyoto (JP)

(72) Inventor: Yoshiyasu Ogasawara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 354 days.

(21) Appl. No.: 15/345,812

(22) Filed: Nov. 8, 2016

(65) Prior Publication Data

US 2017/0128826 A1 May 11, 2017

(30) Foreign Application Priority Data

Nov. 9, 2015 (JP) ................. 2015-219677

(51) Int. Cl.
*A63F 13/213* (2014.01)
*A63F 13/219* (2014.01)
(Continued)

(52) U.S. Cl.
CPC .......... *A63F 13/213* (2014.09); *A63F 13/219* (2014.09); *A63F 13/235* (2014.09);
(Continued)

(58) Field of Classification Search
CPC .... A63F 13/213; A63F 13/235; A63F 3/0325; A63F 3/0346; H04N 1/00; H04N 2101/00; H04N 7/18; G01B 11/14; G01C 3/08
(Continued)

(56) References Cited

U.S. PATENT DOCUMENTS

| 2007/0052177 | A1 | 3/2007 | Ikeda |
| 2010/0201808 | A1* | 8/2010 | Hsu ........................ G06F 3/0325 348/135 |

(Continued)

FOREIGN PATENT DOCUMENTS

| JP | A-H08-210825 | 8/1996 |
| JP | A-H08-210840 | 8/1996 |

(Continued)

OTHER PUBLICATIONS

Translation of Office Action of Japanese Patent Application No. 2015-219677 (dated Jun. 25, 2019).

*Primary Examiner* — Patricia I Young
(74) *Attorney, Agent, or Firm* — Nixon & Vanderhye, P.C.

(57) ABSTRACT

Provided is an information processing system including at least a reflection member, and an information processing apparatus capable of image processing. The reflection member is a retro reflecting material. The information processing apparatus includes an imaging section that captures an image, a first light emitting section, a second light emitting section, and a light source detecting section. The first light emitting section and the second light emitting section each emit light. At least one of a half-power angle and an entrance angle of the second light emitting section is different from that of the first light emitting section. The light source detecting section detects, in the image captured by the imaging section, a light source image including an image of the retro reflecting material.

17 Claims, 6 Drawing Sheets

(51) Int. Cl.
    *A63F 13/235*     (2014.01)
    *A63F 13/428*     (2014.01)
    *G02B 5/136*     (2006.01)
    *H04N 5/225*     (2006.01)
    *H04N 5/235*     (2006.01)
    *H04N 5/33*     (2006.01)

(52) U.S. Cl.
    CPC ............ *A63F 13/428* (2014.09); *G02B 5/136* (2013.01); *H04N 5/2256* (2013.01); *H04N 5/2354* (2013.01); *H04N 5/33* (2013.01); *H04N 5/2254* (2013.01)

(58) Field of Classification Search
    USPC ........................................................ 348/164
    See application file for complete search history.

(56) References Cited

U.S. PATENT DOCUMENTS

2011/0019205 A1\*   1/2011   Gerber ............... G06K 9/00355
    356/615
2016/0109232 A1\*   4/2016   Shin .................... H04N 5/2256
    348/140

FOREIGN PATENT DOCUMENTS

| JP | 2007-54114 | 3/2007 |
| JP | A-2015-158444 | 9/2015 |
| WO | WO 2008/084523 A1 | 7/2008 |

\* cited by examiner

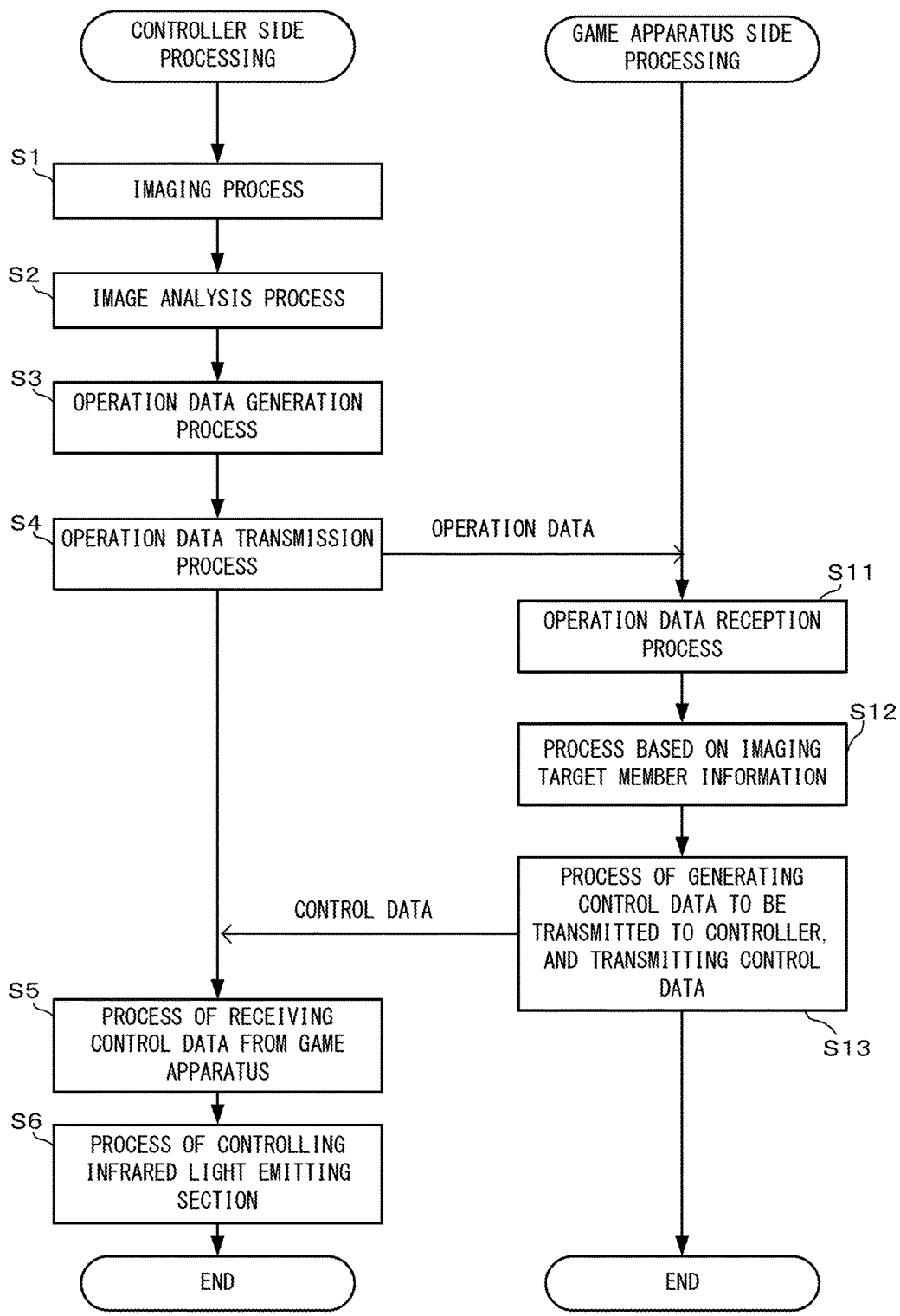

INFORMATION PROCESSING SYSTEM, INFORMATION PROCESSING APPARATUS, AND COMPUTER-READABLE NON-TRANSITORY STORAGE MEDIUM HAVING STORED THEREIN INFORMATION PROCESSING PROGRAM

CROSS REFERENCE TO RELATED APPLICATION

The disclosure of Japanese Patent Application No. 2015-219677, filed on Nov. 9, 2015, is incorporated herein by reference.

FIELD

The exemplary embodiments relate to an information processing system including at least a reflection member, and an information processing apparatus capable of image processing.

BACKGROUND AND SUMMARY

Conventionally, a game operating apparatus which includes a longitudinal housing having a holding portion to be wrapped and held with a palm of a user, and a game system using such a game operation apparatus, have been known. This operation apparatus is provided with an imaging section at a front end, in the longitudinal direction, of the housing. In the game system, an LED module that emits infrared light (infrared ray) is arranged in the vicinity of a screen of a display. The operating state of the game operating apparatus can be estimated by, for example, capturing an image of the infrared light outputted from the LED module by using the imaging section, and analyzing the position of the infrared light in the captured image.

The game system as described above adopts the configuration in which the LED module that emits infrared light is arranged in the vicinity of the display. Regarding this point, the inventors have realized that the configuration of the game system can be made simpler to achieve the same function as described above.

Therefore, it is an object of the exemplary embodiments to provide an information processing system capable of performing light emission control in accordance with various situations and scenes, with a simple configuration.

In order to attain the object described above, the following configurations are exemplified.

A configuration example is an information processing system including at least a reflection member, and an information processing apparatus capable of image processing. The reflection member is a retroreflecting material. The information processing apparatus includes an imaging section, a first light emitting section, a second light emitting section, and a light source detecting section. The imaging section captures an image. The first light emitting section emits light. The second light emitting section emits light. At least one of a half-power angle and an entrance angle of the second light emitting section is different from that of the first light emitting section. The light source detecting section detects, in the image captured by the imaging section, a light source image including an image of the retroreflecting material. The image of the retroreflecting material indicates light that has been emitted from the first light emitting section and/or the second light emitting section and reflected by the retroreflecting material. The light source image is an image portion, in the captured image, relating to various types of reflected lights. The image of the retroreflecting material is an image portion, in the captured image, relating to the reflected light from the retroreflecting material. The first light emitting section and the second light emitting section may be provided in the vicinity of the imaging section.

According to the above configuration example, it is possible to provide an information processing system capable of properly using, in accordance with various situations and/or scenes, the two types of light emitting sections at least either of the half-power angles and the entrance angles of which are different from each other.

In another configuration example, the information processing apparatus may further include a light emission control section that causes one or both of the first light emitting section and the second light emitting section to emit light. The information processing system may further include another information processing apparatus different from the information processing apparatus, and light emission control section may receive instruction data transmitted from the another information processing apparatus to perform light emission control on the basis of the instruction data. Alternatively, the light emission control section may include a distance calculator that calculates a distance from the reflection member to the information processing apparatus, and the light emission control section may perform the light emission control in accordance with the distance calculated by the distance calculator.

According to the above configuration example, ON/OFF control for the two types of light emitting sections can be appropriately performed in accordance with the distance, thereby realizing light emission control in accordance with various situations and/or scenes.

In another configuration example, the half-power angle or the entrance angle of the first light emitting section may be greater than or equal to an angle of view of the imaging section, and the half-power angle or the entrance angle of the second light emitting section may be less than the angle of view of the imaging section.

According to the above configuration example, in a case where a predetermined object is detected on the basis of reflected light of light emitted from a light emitting section, for example, it is possible to achieve reduction in power consumption while maintaining the detection accuracy.

In another configuration example, the first light emitting section and the second light emitting section may be configured to emit infrared light.

According to the above configuration example, viewing action of a user is not hindered. Further, even when the room is dark, it is possible to execute, for example, a recognition process using infrared light such as the reflected light from the reflection member.

In another configuration example, the information processing apparatus may further include a calculator that calculates positional information, in the captured image, of the detected light source image. The calculator may be configured to calculate brightness of each detected light source image or a size of each detected light source image in the captured image. Further, the information processing apparatus may include a reflection member specifying section that specifies the image of the retroreflecting material on the basis of the size of each light source image calculated by the calculator and a distance between light source images in the captured image.

According to the above configuration example, the position of the reflection member in the captured image can be specified, and the orientation (relative to the reflection member) or the like of the information processing apparatus can be calculated on the basis of the specified position of the reflection member.

In another configuration example, an imaging direction of the imaging section and a light emitting direction of the first light emitting section and the second light emitting section may be substantially the same direction.

According to the above configuration example, the direction in which the imaging section of the information processing apparatus faces a certain surface can be calculated accurately.

In another configuration example, the information processing apparatus may be a hand-held information processing apparatus.

According to the above configuration example, it is possible to detect the direction and/or orientation of, for example, a one-hand portable information processing apparatus or a multifunctional controller for games, and execute information processing in accordance with the direction and/or orientation.

Another configuration example is an information processing apparatus including an imaging section, a first light emitting section, a second light emitting section, and a light source detecting section. The imaging section captures an image. The first light emitting section emits light. The second light emitting section emits light. At least one of a half-power angle and an entrance angle of the second light emitting section is different from that of the first light emitting section. The light source detecting section detects, in the image captured by the imaging section, a light source image including an image of the retroreflecting material. The image of the retroreflecting material indicates light that has been emitted from the first light emitting section and/or the second light emitting section and reflected by a retroreflecting material.

According to the above configuration example, light emission control according to various situations and/or scenes can be performed for the two types of light emitting sections at least either of the half-power angles and the entrance angles of which are different from each other.

According to the present embodiment, it is possible to properly use a plurality of light emitting sections in accordance with various situations and/or scenes, with a simple system configuration.

BRIEF DESCRIPTION OF THE DRAWINGS

FIG. 7 is a flowchart illustrating a non-limiting example of a control process according to the present embodiment.

DETAILED DESCRIPTION OF NON-LIMITING EXAMPLE EMBODIMENTS

Hereinafter, an exemplary embodiment will be described.

Figure 1:
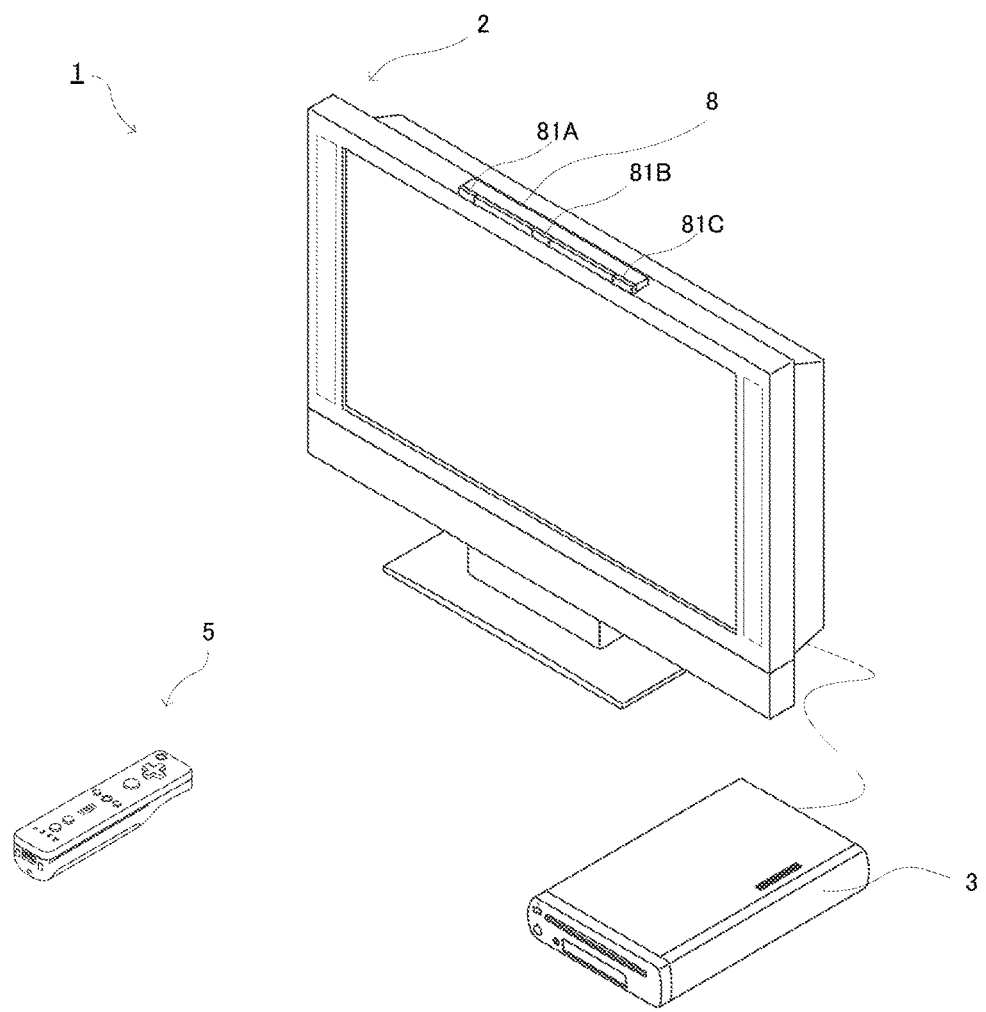
FIG. 1 is a schematic diagram illustrating the whole image of a game system which is a non-limiting example of an embodiment.

FIG. 1 is a perspective view of a game system 1 as a non-limiting example of an information processing system. In FIG. 1, the game system 1 includes: a stationary display device (hereinafter, referred to as "television") 2 typified by, for example, a television receiver; a game apparatus 3; a controller 5 as a non-limiting example of a hand-held input device; and an imaging target member 8 with a retroreflecting material (hereinafter, simply referred to as "imaging target member"). The game system 1 causes the game apparatus 3 to execute game processing on the basis of a game operation using the controller 5, and causes the television 2 to display a game image obtained in the game processing.

An optical disc (not shown), which is a non-limiting example of an information storage medium changeable with respect to the game apparatus 3, is detachably loaded into the game apparatus 3.

The television 2 is connected to the game apparatus 3 via a connection cord. The television 2 displays a game image obtained by the game processing executed in the game apparatus 3. In another embodiment, the game apparatus 3 and the stationary display device may be integrated with each other. Communication between the game apparatus 3 and the television 2 may be wireless communication.

The imaging target member 8 is provided in the vicinity of the screen of the television 2 (on the top surface of the screen in FIG. 1). A user (player) can perform a game operation of moving the controller 5. The imaging target member 8 is used by the game apparatus 3 to calculate the orientation (relative to the imaging target member 8) and the like of the controller 5. The imaging target member 8 includes three retroreflecting material parts 81A to 81C (hereinafter sometimes collectively referred to as "retroreflecting material 81"). The retroreflecting material 81 is a material that reflects incident light to the incident direction of the light (the incident angle is equal to the exit angle).

Figure 2:
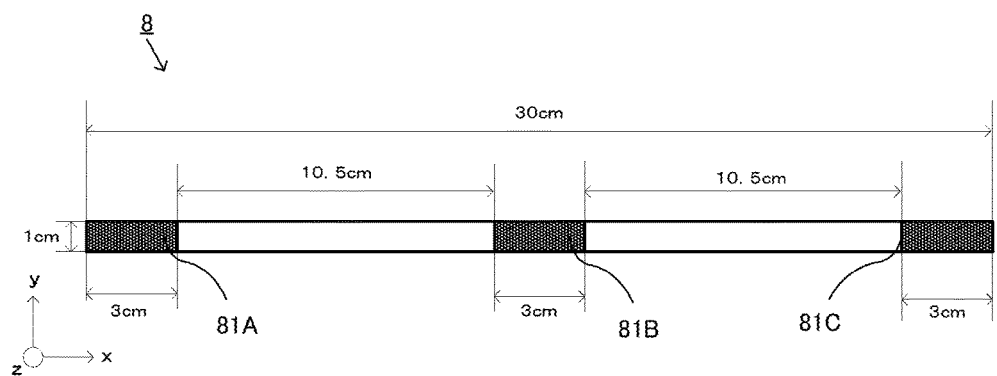
FIG. 2 is a schematic diagram when an imaging target member 8 is seen from the front.

FIG. 2 illustrates a non-limiting example of the size of the imaging target member 8 and arrangement of the retroreflecting material 81. FIG. 2 is a schematic diagram of the imaging target member 8 seen from the front. In the example of FIG. 2, the imaging target member 8 has a width (length in the x-axis direction) of 30 cm, and a height (length in the y-axis direction) of 1 cm. It is assumed that the imaging target member 8 has a depth (length in the z-axis direction) that allows the imaging target member 8 to be placed on the top surface of the screen of the television 2. The retroreflecting material part 81A is disposed at a left end of the imaging target member 8, the retroreflecting material part 81B is disposed in the center of the imaging target member 8, and the retroreflecting material part 81C is disposed at a right end of the imaging target member 8. Each retroreflecting material part 81 has a width of 3 cm. The retroreflecting material parts 81 are arranged at intervals of 10.5 cm. That is, the retroreflecting material parts 81 are arranged at regular intervals.

The arrangement interval and the size shown in FIG. 2 are merely examples, and the present disclosure is not limited thereto. Other arrangement intervals and other sizes may be adopted.

The controller 5 provides the game apparatus 3 with operation data representing the content of an operation performed on the controller 5. The controller 5 and the game apparatus 3 are wirelessly communicable with each other. In the present embodiment, for example, the Bluetooth (registered trademark) technology is used for wireless communication between the controller 5 and the game apparatus 3. In another embodiment, the controller 5 and the game apparatus 3 may be connected with each other by a wired connection. In addition, the game apparatus 3 is communicable with a plurality of controllers, and therefore a plurality of players can play a game using a predetermined number of controllers 5 simultaneously. In the present embodiment, the controller 5 is operated by using a battery as a power source.

In the present embodiment, an infrared light emitting section (IR-LED in this embodiment) and an infrared camera are provided at a front surface (front end side) of the controller 5. Therefore, when the front surface of the controller 5 is turned to the imaging target member 8, infrared light is applied to the imaging target member 8. As a result, the infrared light emitted from the infrared light emitting section is reflected by the retroreflecting material 81. Therefore, in an image obtained by capturing the infrared light with the infrared camera, reflected light from the retroreflecting material 81 is projected (for example, the reflected light is projected as three light spots having high luminance levels). Accordingly, by analyzing the capture image to specify (detect) the reflected light from the retroreflecting material in the captured image and then calculating the position and the like of the reflected light in the captured image, the direction (indication direction) to which the front surface of the controller 5 is turned and/or the orientation of the controller 5 can be recognized.

In the present embodiment, the number of the retroreflecting material parts 81 arranged in the imaging target member 8 is three, which is determined in consideration of balance between analytic precision and processing load in the analysis process for specifying the reflected light from the retroreflecting material parts 81. That is, if the number of the retroreflecting material parts 81 is too few, accuracy might be reduced. If the number of the retroreflecting material parts 81 is too many, processing load on the analysis process might be increased. In terms of keeping balance between the detection accuracy and the processing load, three retroreflecting material parts 81 are provided in the present embodiment. In another embodiment, however, the number of the retroreflecting material parts 81 included in the imaging target member 8 may be one or two (if conditions for ensuring sufficient detection accuracy or the like are satisfied). On the other hand, if sufficient arithmetic processing capability is expected, four or more retroreflecting material parts 81 may be provided.

Figure 3:
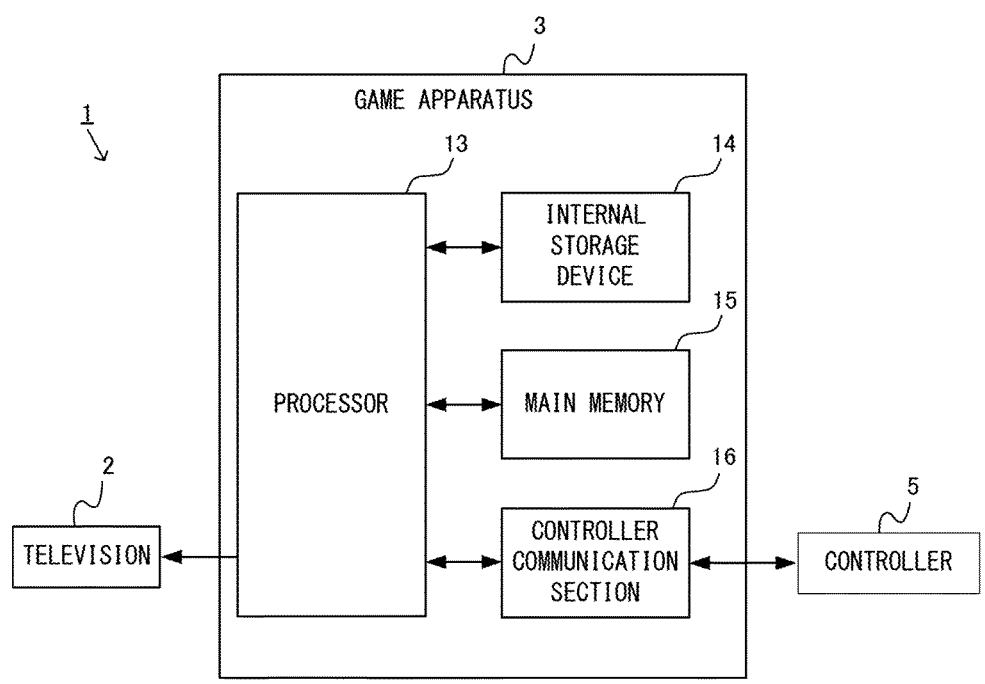
FIG. 3 is a block diagram of a game apparatus 3.

Next, the internal structure of the game apparatus 3 will be described. FIG. 3 is a block diagram of the game apparatus 3. In FIG. 3, the game apparatus 3 includes a processor 13, an internal storage device 14, a main memory 15, and a controller communication section 16. The processor 13 performs various controls for the game apparatus 3. In addition, the processor 13 receives, via the controller communication section 16, various data transmitted from the controller 5, and executes information processing based on the various data. The controller communication section 16 is, for example, a Bluetooth chip. A computer program to be executed by the processor 13 is stored in the internal storage device 14. The internal storage device 14 is typically a flash EEPROM. The main memory 15 temporarily stores computer programs and information therein.

Regarding the processor 13 of the game apparatus 3, later-described processing may be performed by a single processor 13, or a plurality of processors 13 may be provided in the single game apparatus 3, and the processing may be performed by using the plurality of processors 13 in combination.

Figure 4:
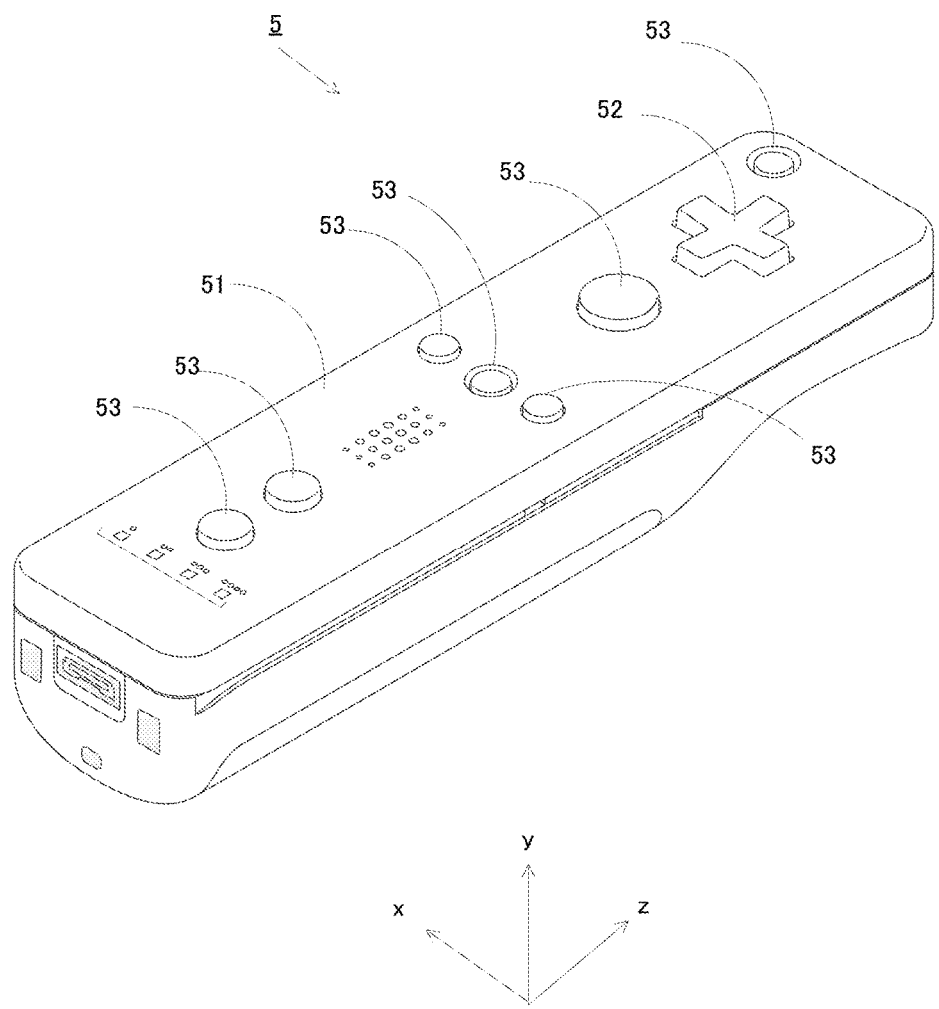
FIG. 4 is a perspective view illustrating an external configuration of a controller 5.

Next, the controller 5 will be described. FIG. 4 is a perspective view illustrating the external configuration of the controller 5. In FIG. 4, the controller 5 includes a housing 51 formed by plastic molding. The housing 51 has a substantially parallelepiped shape extending in its longitudinal direction from front to rear (the z-axis direction shown in FIG. 4). The entire housing 51 can be held with one hand by an adult or even a child. The controller 5, as an operation section, includes a cross key 52, a plurality of operation buttons 53, etc. The controller 5 also includes a motion sensor. A user can perform a game operation by pressing the buttons provided on the controller 5, and moving the controller 5 per se to change the position and/or orientation (tilt) thereof.

Figure 5:
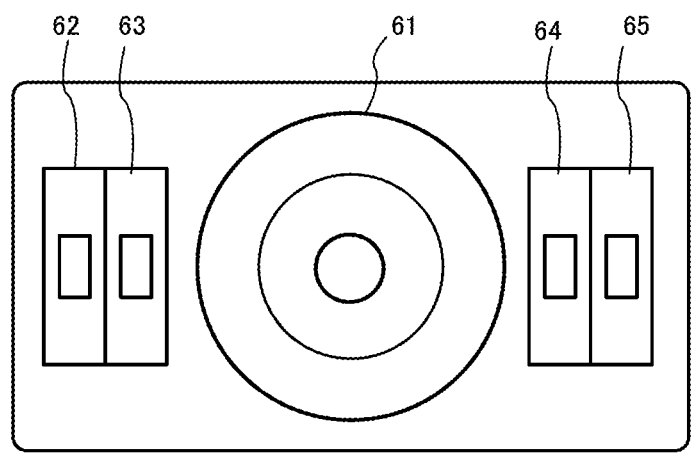
FIG. 5 is a schematic diagram illustrating a front surface of a housing 51.

On a front surface of the housing 51, an infrared camera and four infrared light emitting sections are provided. FIG. 5 is a schematic diagram illustrating the front surface of the housing 51. In FIG. 5, an infrared camera 61 (more specifically, a light incident surface thereof) is provided. In the present embodiment, an angle of view of the infrared camera is 120°. (In the present embodiment, "angle of view" signifies "diagonal angle of view".)

Further, in FIG. 5, in a region to the left of the infrared camera 61, a first infrared light emitting section 62 and a second infrared light emitting section 63 are disposed. In addition, in a region to the right of the infrared camera 61 in FIG. 5, a third infrared light emitting section 64 and a fourth infrared light emitting section 65 are disposed. That is, four infrared light emitting sections are disposed on the same surface with the infrared camera 61. In the present embodiment, the four infrared light emitting sections are disposed at right and left neighboring positions around the infrared camera 61 (in this example, two on the left side and two on the right side). Therefore, the light emission direction of these four infrared light emitting sections is substantially the same as the imaging direction of the infrared camera 61.

The amount of light emitted from the first infrared light emitting section 62 and the second infrared light emitting section 63 is the same as that emitted from the third infrared light emitting section 64 and the fourth infrared light emitting section 65, but the half-power angle (an angle at which the amount of light is halved as compared to that when light is emitted frontward, and which is also called an entrance angle) of the first infrared light emitting section 62 and the second infrared light emitting section 63 is different from that of the third infrared light emitting section 64 and the fourth infrared light emitting section 65. Specifically, the half-power angle of the first infrared light emitting section 62 and the second infrared light emitting section 63 is 130°, while the half-power angle of the third infrared light emitting section 64 and the fourth infrared light emitting section 65 is 75°. Since the angle of view of the infrared camera is 120° as described above, the first infrared light emitting section 62 and the second infrared light emitting section 63 having the half-power angle greater than or equal to the angle of view of the infrared camera 61 are used. In addition, the third infrared light emitting section 64 and the fourth infrared light emitting section 65 having the half-power angle less than the angle of view of the infrared camera is used.

In the following description, the first infrared light emitting section 62 and the second infrared light emitting section 63 are sometimes collectively referred to as "130° light emitting section" while the third infrared light emitting section 64 and the fourth infrared light emitting section 65 are sometimes collectively referred to as "75° light emitting section".

The positional relationship between the infrared camera 61 and the infrared light emitting sections is not limited to that shown in FIG. 5. The infrared camera 61 and the infrared light emitting sections may be disposed at any positions as long as the infrared light can be applied to the imaging target member 8 (retroreflecting material 81) and the reflected light thereof can be captured (imaged). For example, the infrared light emitting sections may be disposed above and below the infrared camera 61.

Figure 6:
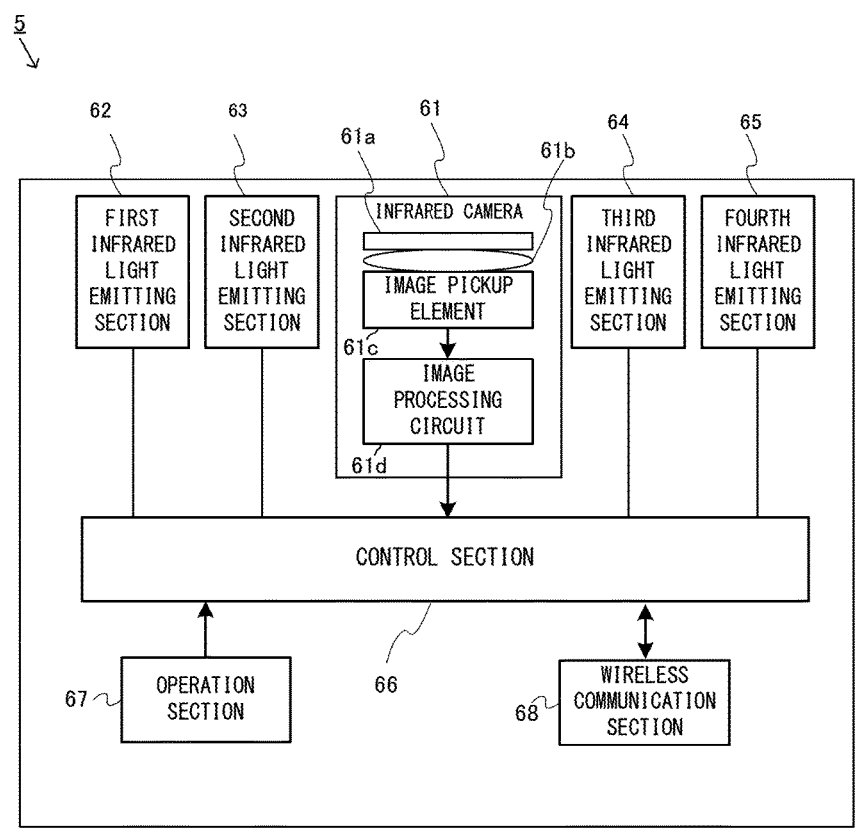
FIG. 6 is a block diagram illustrating an internal configuration of the controller 5.

Next, the internal configuration of the controller 5 will be described. FIG. 6 is a block diagram illustrating the internal configuration of the controller 5. The controller 5 includes the infrared camera 61, the first infrared light emitting section 62, the second infrared light emitting section 63, the third infrared light emitting section 64, the fourth infrared light emitting section 65, a control section 66, an operation section 67 (various operation buttons), and a wireless communication section 68. The controller 5 transmits data representing the content of an operation performed on the controller 5, as operation data, to the game apparatus 3.

The control section 66 controls the operation in the controller 5. Specifically, the control section 66 receives output data from the respective input sections (the operation section 67 and the infrared camera 61), and transmits these data as operation data to the game apparatus 3 through the wireless communication section 68. In addition, the control section 66 receives, from the game apparatus 3, data including a predetermined control instruction, and performs ON/OFF control for the first infrared light emitting section 62, the second infrared light emitting section 63, the third infrared light emitting section 64, and the fourth infrared light emitting section 65 on the basis of the control instruction. Furthermore, the control section 66 performs operation control for the controller 5 (e.g., power supply control). In other words, the control section 66 has the function of controlling the controller 5, and in that sense, the controller 5 is a type of a hand-held information processing apparatus.

In the present embodiment, wireless communication is performed between the controller 5 and the game apparatus 3. In another embodiment, communication may be performed therebetween via a wire.

Each of the first infrared light emitting section 62, the second infrared light emitting section 63, the third infrared light emitting section 64, and the fourth infrared light emitting section 65 emits infrared light on the basis of control by the control section 66. As described above, the half-power angle of the first infrared light emitting section 62 and the second infrared light emitting section 63 is 130°, while the half-power angle of the third infrared light emitting section 64 and the fourth infrared light emitting section 65 is 75°.

The infrared camera 61 includes an infrared filter 61a, a lens 61b, an image pickup element 61c, and an image processing circuit 61d (hardware engine). The infrared filter 61a allows only infrared light to pass therethrough, among lights incident on the front surface of the controller 5. The lens 61b collects the infrared light that has passed through the infrared filter 61a, and causes the collected infrared light to enter the image pickup element 61c. The image pickup element 61c is a solid-state image pickup element such as a CMOS sensor or a CCD sensor, and receives the infrared light collected by the lens 61b to output an image signal.

The imaging target member 8 as a target of imaging is provided with the retroreflecting material 81 as described above. Therefore, infrared lights emitted from the first to fourth infrared light emitting sections 62 to 65 are reflected by the retroreflecting material 81 and applied to the infrared camera 61 as reflected light. Since the infrared filter 61a is provided, the image pickup element 61c receives only the infrared lights that have passed through the infrared filter 61a to generate image data. In the following description, the image captured by the image pickup element 61c is referred to as a captured image. In addition, portions, corresponding to the infrared lights, which appear in the captured image (images of the infrared lights, images of the light sources) are referred to as light source spots.

The image data generated by the image pickup element 61c is processed in the image processing circuit 61d. The image processing circuit 61d calculates the positions, sizes, and luminances of light source spots in the captured image. The light source spots that appear in the captured image also include infrared light other than the reflected light from the retroreflecting material 81. In the following description, an image, relating to the light source spot, other than the reflected light from the retroreflecting material 81 is referred to as "noise light". In addition, an image relating to three light source spots corresponding to the reflected light from the retroreflecting material parts 81A, 81B, and 81C is referred to as "imaging target member reflected light". The image processing circuit 61d performs, for example, a process of eliminating such noise light, and performs a process of specifying the imaging target member reflected light. Then, the image processing circuit 61d outputs, to the control section 66, coordinates indicating the position of the specified imaging target member reflected light, information indicating the magnitude of the imaging target member reflected light, and information indicating the luminance of the imaging target member reflected light. These data are transmitted by the control section 66 to the game apparatus 3 as a part of the operation data. In the following description, the above data is referred to as "imaging target member information".

Next, the outline of control for the four infrared light emitting sections 62 to 65 according to the present embodiment will be described. As described above, two types of infrared light emitting sections (the 130° light emitting section and the 75° light emitting section) having different half-power angles are provided on the front surface of the controller 5. If, for example, the amounts of light of the four infrared light emitting sections 62 to 65 are almost equal to each other, the infrared light from the 75° light emitting section is delivered farther than the infrared light from the 130° light emitting section. By utilizing this feature, in the present embodiment, control to switch ON/OFF of the two types of infrared light emitting sections according to a situation is performed. Specifically, when infrared light (including reflected light) from a position apart by a predetermined distance or more from the controller 5 is desired to be recognized (hereinafter referred to as long distance recognition), all the four infrared light emitting sections are turned ON. On the other hand, when it is enough to recognize only infrared light from a position apart by less than the predetermined distance from the controller 5, i.e., from a relatively near position (hereinafter referred to as short distance recognition), control is performed to turn on the 130° light emitting section and turn off the 75° light emitting section. For example, in the situation where the distance between the imaging target member 8 and the controller 5 is greater than or equal to the predetermined distance, all the four infrared light emitting sections 62 to 65 are turned ON. On the other hand, in the situation where the distance between the imaging target member 8 and the controller 5 is less than the predetermined distance, only the 130° light emitting section is turned ON (since the half-power angle of the 130° light emitting section is wider than the angle of view of the infrared camera as described above, the light from the infrared camera is not missed). Further, in another example, a case is assumed in which, during progress of game processing, a situation that the imaging target member 8 at a position apart by a predetermined distance or more is desired to be recognized (long distance recognition) and a situation that although the imaging target member 8 need not be recognized, an object other than the imaging target member 8 is desired to be recognized by short distance recognition are properly used according to the game progress (for example, the palm of a user is desired to be recognized by using the infrared camera 61). Also in this case, ON/OFF control for the two types of infrared light emitting sections may be performed as described above. In still another example, when a plurality of applications can be selectively executed on the game apparatus side, ON/OFF control for the two types of infrared light emitting sections may be performed in accordance with an application being executed. Even during execution of the same application, ON/OFF of the two types of infrared light emitting sections may be switched in accordance with scenes. Thus, by performing control to switch ON/OFF of the two types of infrared light emitting sections in accordance with the use case, power consumption of the infrared light emitting sections can be reduced. In addition, it is possible to realize light emission control in accordance with various situations and scenes.

In the present embodiment, two 130° light emitting sections and two 75° light emitting sections are provided. This configuration is based on the viewpoint of ensuring sufficient amount of light. Therefore, in another embodiment, one 130° light emitting section and one 75° light emitting section may be provided, or three or more 130° light emitting sections and three or more 75° light emitting sections may be provided, in accordance with the required amount of light.

Next, the control process as described above will be described in detail. FIG. 7 is a flowchart illustrating a non-limiting example of the control process according to the present embodiment. In the example described below, ON/OFF control for the infrared light emitting sections 62 to 65 is performed in accordance with the imaging target member 8 and the controller 5. In the processing of this flowchart, the following processes are generally performed. First, the imaging target member information generated in the process in the controller 5 is transmitted to the game apparatus 3. Next, on the basis of the imaging target member information, the distance between the imaging target member 8 and the controller 5 is calculated on the game apparatus side. Further, in accordance with this distance, information indicating an instruction to switch ON/OFF of the infrared light emitting sections 62 to 65 is transmitted from the game apparatus 3 to the controller 5. Then, in the controller 5, ON/OFF control for each of the infrared light emitting section 62 to 65 is performed on the basis of the transmitted information.

In FIG. 7, a flowchart of controller-side processing is shown on the left side, while a flowchart of game apparatus-side processing is shown on the right side. The processing of this flowchart is repeatedly executed in predetermined cycles (e.g., 1/60 sec).

First, in step S1, the infrared camera 61 performs an imaging process on the basis of an instruction from the control section 66 of the controller 5. That is, a process of generating a captured image is executed by means of the image pickup element 61c.

Next, in step S2, the image processing circuit 61d in the infrared camera 61 executes a process of analyzing the captured image. In this process, for example, the following processes are executed. First, a process of detecting light source spots from the captured image is executed (this process is also called a clustering process). Next, a process of excluding the noise light from the detected light source spots to specify imaging target member reflected light is executed (imaging target member reflected light appears as linearly-arrayed three light source spots). Further, a process of calculating the position (coordinates), magnitude, and luminance of the imaging target member reflected light in the captured image to generate the imaging target member information is executed. Then, the imaging target member information is outputted from the image processing circuit 61d to the control section 66.

Next, in step S3, the control section 66 executes a process of generating operation data including the imaging target member information. In the subsequent step S4, the control section 66 executes a process of transmitting the operation data to the game apparatus 3.

Now, the process on the game apparatus 3 side will be described. In step S11, the processor 13 of the game apparatus 3 executes a process of receiving the operation data transmitted from the controller 5.

Next, in step S12, the processor 13 executes a process of calculating the distance between the controller 5 and the imaging target member 8 on the basis of the imaging target member information included in the operation data. For example, the distance is calculated on the basis of the intervals among the three light source spots of the imaging target member reflected light, or the sizes of the respective light source spots.

Next, in step S13, the processor 13 executes a process of forming control data to be transmitted to the controller 5. This control data includes instruction information for instructing ON/OFF switching of the infrared light emitting sections 62 to 65 of the controller 5 on the basis of the calculated distance. The processor 13 transmits the control data to the controller 5. Thereafter, the processor 13, as appropriate, executes, for example, a process of controlling movement of a cursor and/or a pointer displayed on the screen on the basis of the orientation or the like of the controller 5, although such a process is not illustrated.

Returning back to the process on the controller 5 side, in step S5, the control section 66 executes a process of receiving the control data from the game apparatus 3. Next, in step S6, the control section 66 executes ON/OFF control for the infrared light emitting sections 62 to 65 on the basis of the control data.

By repeatedly performing the above-described processes in predetermined cycles, the infrared light emitting sections 62 to 65 are appropriately turned ON/OFF in accordance with the distance between the imaging target member 8 and the controller 5. Thus, power consumption of the controller 5 can be reduced.

In another embodiment, the control section 66 of the controller 5 may execute the process of calculating the distance between the controller 5 and the imaging target member 8 as described above. That is, the controller 5 itself may be configured to calculate the distance.

As described above, in the present embodiment, the infrared camera 61 is provided at the front surface of the controller 5, and further, the two types of infrared light emitting sections 62 to 65 having different entrance angles or half-power angles are provided at positions to the left and the right of the infrared camera 61. Switching control for these two types of infrared light emitting sections is performed in accordance with the use case. Thereby, reduction in power consumption can be achieved while ensuring convenience of the controller 5. In addition, control according to an application being executed can be performed, or control according to each scene can be performed even during execution of the same application. Thereby, imaging target detecting accuracy can be improved while suppressing saturation of luminance values and/or unnecessary reflection. For example, when all the infrared light emitting sections 62 to 65 are caused to emit light, the luminance values (brightnesses) thereof are saturated or unnecessary reflection occurs, which makes it difficult to detect the imaging target. Even in such a case, the above-described light emission control according to the situations and scenes enables accurate detection of the imaging target.

Further, in the present embodiment, since infrared light which is invisible light is used, viewing action of the user is not hindered. Further, even when the room is dark, it is possible to execute, for example, the process of controlling movement of the cursor or the pointer displayed on the screen in accordance with the orientation or the like of the controller 5 as described above.

While infrared light is used as a non-limiting example in the present embodiment, other types of invisible light may be used.

Regarding the processor that executes the above-described processes, the processor is mounted in the game apparatus 3 in the above embodiment. However, in another embodiment, a single processor or a plurality of processors may be mounted in the controller 5. Then, all or part of the processes performed in the game apparatus 3 in the above embodiment may be executed in the processor(s) mounted in the controller 5. Further, part of the processes performed in the controller 5 may be executed in the processor mounted in the game apparatus 3.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:
1. An information processing system, comprising:
a reflection member being of a retroreflecting material; and
an information processing apparatus configured for image processing, the information processing apparatus comprising:
an imaging device configured to capture an image;
a first light emitting device configured to emit light;
a second light emitting device configured to emit light, at least one of a half-power angle and an entrance angle of the second light emitting device being different from that of the first light emitting device;
a light source detecting device configured to detect, in the image captured by the imaging device, a light source image including an image of the retroreflecting material, the image of the retroreflecting material indicating light that has been emitted from the first light emitting device and/or the second light emitting device and reflected by the retroreflecting material; and
control circuitry configured to selectively power the first light emitting device and/or the second light emitting device based on a distance from the reflection member to the information processing apparatus.

2. The information processing system according to claim 1, wherein the first light emitting device and the second light emitting device are provided at positions in the vicinity of the imaging device.

3. The information processing system according to claim 1, wherein the control circuitry is further configured to cause one or both of the first light emitting device and the second light emitting device to emit light.

4. The information processing system according to claim 3, further comprising an additional information processing apparatus different from the information processing apparatus, wherein
the control circuitry is configured to receive instruction data transmitted from the additional information processing apparatus, and performs light emission control on the basis of the instruction data.

5. The information processing system according to claim 1, wherein
the half-power angle or the entrance angle of the first light emitting device is greater than or equal to an angle of view of the imaging device, and
the half-power angle or the entrance angle of the second light emitting device is less than the angle of view of the imaging device.

6. The information processing system according to claim 1, wherein the first light emitting device and the second light emitting device each emit infrared light.

7. The information processing system according to claim 1, wherein the information processing apparatus is configured to calculate positional information, in the captured image, of the detected light source image.

8. The information processing system according to claim 7, wherein brightness of each detected light source image or a size of each detected light source image in the captured image is calculated.

9. The information processing system according to claim 8, wherein the information processing apparatus is further configured to specify the image of the retroreflecting material on the basis of the calculated size of each light source image and a distance between light source images in the captured image.

10. The information processing system according to claim 1, wherein an imaging direction of the imaging device and a light emitting direction of the first light emitting device and the second light emitting device are substantially the same direction.

11. The information processing system according to claim 1, wherein the information processing apparatus is a handheld information processing apparatus.

12. An information processing apparatus, comprising:
an imaging device configured to capture an image;
a first light emitting device configured to emit light;
a second light emitting device configured to emit light, at least one of a half-power angle and an entrance angle of the second light emitting device being different from that of the first light emitting device;
a light source detecting device configured to detect, in the image captured by the imaging device, a light source image including an image of retroreflecting material from a reflection member, the image of the retroreflecting material indicating light that has been emitted from the first light emitting device and/or the second light emitting device and reflected by the retroreflecting material; and control circuitry configured to selectively power the first light emitting device and/or the second light emitting device based on a distance from the reflection member to the information processing apparatus.

13. An information processing method for controlling an information processing system including at least a reflection member being of a retroreflecting material, and an information processing apparatus capable of image processing, the information processing method comprising:

capturing an image using an imaging device;

emitting light using a first light emitting device;

emitting light using a second light emitting device, at least one of a half-power angle and an entrance angle of the second light emitting device being different from that of the first light emitting device;

detecting, in the image captured using the imaging device, a light source image including an image of the retroreflecting material, the image of the retroreflecting material indicating light that has been emitted from the first light emitting device and/or the second light emitting device and reflected by the retroreflecting material; and selectively powering the first light emitting device and/or the second light emitting device based on a distance from the reflection member to the information processing apparatus.

14. A non-transitory computer-readable storage medium having store thereon an information processing program to be executed by a computer of an information processing system capable of image processing, the information processing program, when executed, causing the computer to provide execution comprising:

capturing an image using an imaging device;

emitting light using a first light emitting device;

emitting light using a second light emitting device, at least one of a half-power angle and an entrance angle of the second light emitting device being different from that of the first light emitting device;

detecting, in the image captured by the imaging device, a light source image including an image of retroreflecting material from a reflection member, the image of the retroreflecting material indicating light that has been emitted from the first light emitting device and/or the second light emitting device and reflected by the retroreflecting material; and selectively powering the first light emitting device and/or the second light emitting device based on a distance from the reflection member to the information processing system.

15. The information processing system according to claim 1, wherein when the distance corresponds to long distance recognition, the control circuitry selectively powers both the first light emitting device and the second light emitting device.

16. The information processing system according to claim 1, wherein when the distance corresponds to short distance recognition, the control circuitry selectively powers one of the first light emitting device or the second light emitting device while disabling power to one of the first light emitting device or the second light emitting device.

17. The information processing system according to claim 1, wherein the control circuitry selectively powers the first light emitting device and/or the second light emitting device in accordance with an application being executed.

* * * * *